United States Patent [19]

Steinrötter et al.

[11] 4,010,246
[45] Mar. 1, 1977

[54] PROCESS FOR PREPARING SULFUR DIOXIDE

[75] Inventors: Heinz Steinrötter, Eppstein, Taunus; Karl Walderbach, Frankfurt am Main; Hansjörg Mathieu, Schneidhain, Taunus, all of Germany

[73] Assignee: Hoechst Aktiengesellschaft, Frankfurt am Main, Germany

[22] Filed: Oct. 10, 1975

[21] Appl. No.: 621,583

[30] Foreign Application Priority Data

Oct. 12, 1974 Germany .......................... 2448676

[52] U.S. Cl. .................................. 423/542; 55/72; 423/210.5; 423/215.5; 423/531; 423/543
[51] Int. Cl.[2] .................. C01B 17/58; B01D 47/00
[58] Field of Search ........... 423/522, 533, 539–543, 423/210.5, 215.5, 531; 55/72, 73, 95

[56] References Cited

UNITED STATES PATENTS

| | | | |
|---|---|---|---|
| 2,452,517 | 10/1948 | Broughton | 423/542 |
| 3,359,069 | 12/1967 | Furkert et al. | 423/540 |
| 3,383,171 | 5/1968 | Haeseler et al. | 423/540 |
| 3,823,530 | 7/1974 | Miyashita | 55/72 |
| 3,825,657 | 7/1974 | Jennings | 423/540 |
| 3,906,039 | 9/1975 | Furkert | 423/540 |

FOREIGN PATENTS OR APPLICATIONS

| | | | |
|---|---|---|---|
| 1,136,903 | 12/1968 | United Kingdom | 423/210.5 |
| 775,818 | 5/1975 | United Kingdom | 423/210.5 |
| 596,386 | 1/1948 | United Kingdom | 423/542 |
| 993,412 | 5/1965 | United Kingdom | 423/522 |

*Primary Examiner*—Oscar R. Vertiz
*Assistant Examiner*—Gary P. Straub
*Attorney, Agent, or Firm*—Curtis, Morris & Safford

[57] ABSTRACT

Finely divided sulfur and an oxygen containing gas are combined and burnt. Finely divided sulfuric acid is introduced into the hot flame gases. The resulting gas containing $SO_2$, water and oxygen can be processed to pure $SO_2$.

7 Claims, 1 Drawing Figure

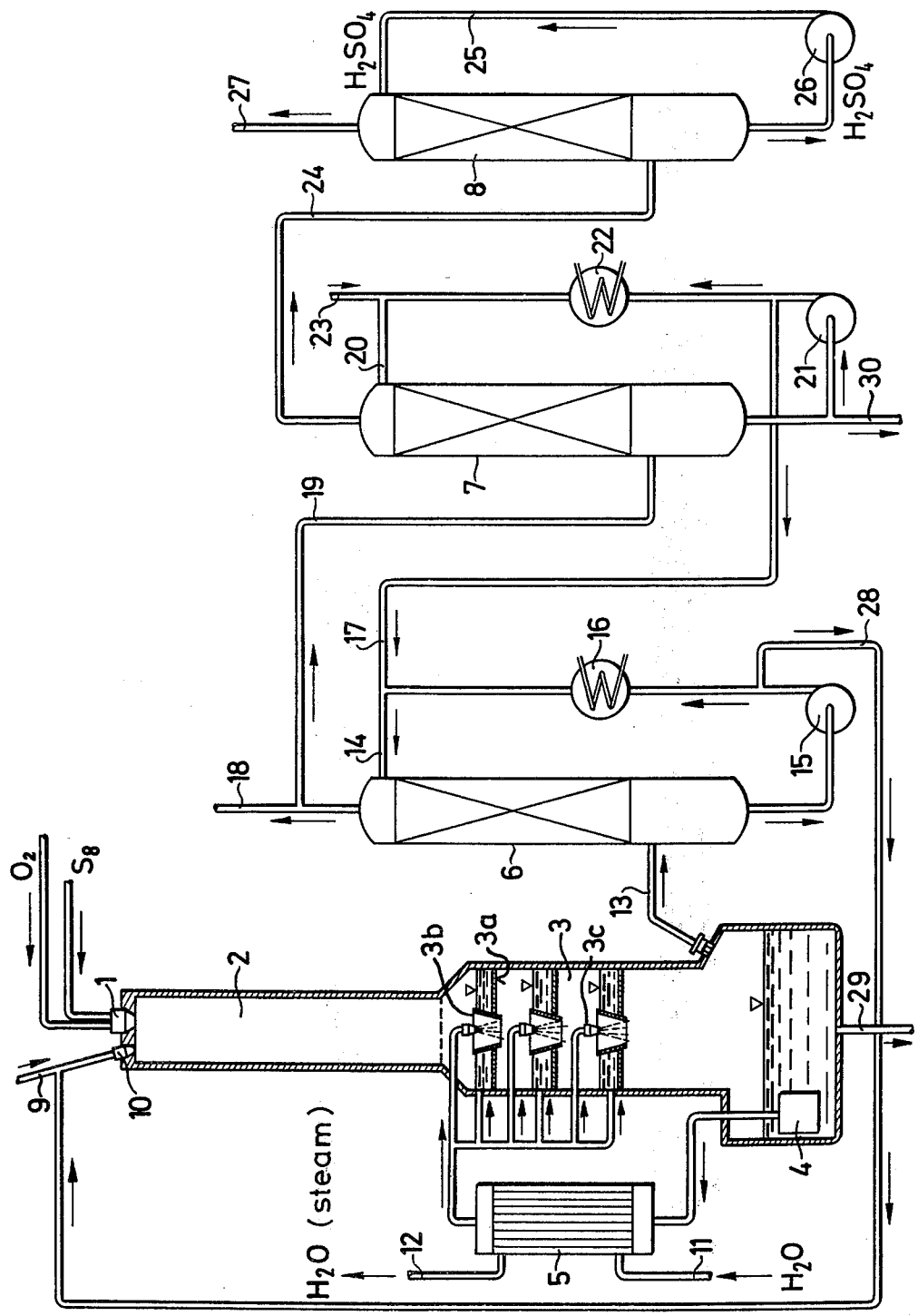

PROCESS FOR PREPARING SULFUR DIOXIDE

The present invention relates to a process for preparing sulfur dioxide and mixtures of sulfur dioxide and oxygen by combustion of sulfur, whereby the released reaction heat is used for dissociating sulfuric acid into sulfur dioxide, water and oxygen. The invention moreover relates to a process for cleaving aqueous impure sulfuric acid obtained in industry. Hitherto there have been no suitable possibilities of application for a part of these acids because of technical and economical reasons. The proposed process permits cleaving even highly impure sulfuric acids in an economical manner and using them in the form of sulfur dioxide, sulfur trioxide or (in the form of a) pure sulfuric acid.

It has already been proposed to introduce sulfuric acid of a content of at least 60% into an oil or natural gas flame by a nozzle or to atomize it onto a fluidized bed of solid matter heated by an oil or natural gas burner. In both cases cleaving of the sulfuric acid is carried out at temperatures of about 1000° C. These cleaving processes have in common that they work with air as oxidant and that the gases resulting from the cleavage process, consequently, contain a high portion of nitrogen. The apparatus for purifying and working up must therefore have rather large dimensions.

It is moreover difficult to liberate the large quantities of inert gas, which are released at the atmosphere, completely of $SO_2$ and $SO_3$.

In the case of sulfuric acid contaminated with mineral salts difficulties may moreover arise in the heat recovery of the hot gases resulting from the cleavage, as salts and metallic oxides preferably deposit on the cold tube walls of the waste heat exchanger.

The present invention seeks to avoid the disadvantages of the known processes and to cleave the waste sulfuric acid by means of a sulfur/oxygen burner at a temperature of about 1000° to 1500° C and to liberate the gas mixture formed from salts, optionally.

A process has now been found for preparing sulfur dioxide, which comprises combining and burning oxygen containing gas and finely divided liquid sulfur and contacting finely divided sulfuric acid with the hot flame gases. Among the oxygen containing gases technical oxygen is preferably used. Under technical pure oxygen there may understood oxygen having a content of more than 70% by volume, especially of more than 90% by volume. The higher the content of oxygen, the fewer ballast gases must be separated finally from $SO_2$ formed.

The gases resulting from the cleavage mainly comprise sulfur dioxide, water and oxygen besides further compounds such as $SO_3$. Water, oxygen and $SO_3$ may be separated from sulfur dioxide by successive purification steps. The sulfuric acid used need not be pure, but may contain organic and mineral impurities, especially metallic salts. High outputs are obtained with a small apparatus, owing to the fact that only small gas volumes are used when using technical oxygen.

For producing the sulfur/oxygen flame liquid sulfur($S_8$) and oxygen($O_2$) are introduced and burnt in a rotation burner or a bi-component nozzle burner 1. Any form of a burner enabling reacting and burning a liquid and a gaseous medium is suitable. The flame temperature of the visible flame is about 2000° C. The oxygen may be used stoichiometrically or in an excess. Molar proportions of $O_2$ and S of about 1.0 to 1.55 have proved particularly advantageous. Stoichiometrical quantities are advantageously used when pure $SO_2$ or sulfites shall be prepared. An excess of oxygen optionally is advisable when the cleavage gases formed shall be oxidized catalytically after purification to give $SO_3$. The sulfuric acid used for cleaving is fed to the injection nozzle 10 via conduit 9 and contacted with the hot flame gases in a finely divided form. Sulfuric acid is advantageously introduced into the hot $SO_2$ gas in a zone outside of the visible flame, in order to avoid that the exothermal combustion of the sulfur be affected. For atomizing the sulfuric acid one-component nozzles of stainless steel or procelaine having an angle of atomization of from 60° to 90° C have proved advantageous. They are suitably fixed at the wall of the combustion chamber and only slightly project into the combustion zone. The direction of atomization of the sulfuric acid should approximately correspond to the direction of the hot gas current.

The invention will be illustrated by way of example in the accompanying drawing, which is a flow scheme of the process of the invention.

The hot gases produced in the burner 1 are collected in a combustion chamber 2 having heat resistant walls. Chambers lined with highly refractory stones have proved especially advantageous. The walls are suitably cooled on the outside. Unlined cooled steel tubes may also be used, but the good heat transmission leads to a rapid temperature decrease of the reaction gases and consequently causes an eventual residual content of unburnt sulfur. The lining must be such that the temperature of the wall is at least 1,200° C, preferably of from 1,400° to 1,500° C. At these temperatures sulfur still is burnt to a sufficient extent. The concentration of the introduced sulfuric acid is not critical. Sulfuric acid having a concentration of 50% or more however, is preferably used. For evaporating the water a higher energy is required than for cleaving the same quantity of concentrated sulfuric acid. The energy released in the reaction of 400 kg of oxygen with 400 kg of sulfur is sufficient for cleaving either 340 kg of 20% acid or 420 kg of 80% acid. The thermal energy of the combustion gases is used for evaporating water, cleaving sulfuric acid as well as for burning organic impurities. Possibly present mineral salts moreover are completely melted. These processes take place in the combustion chamber, where the burner is fixed. The quantity of sulfuric acid to be contacted with the hot combustion gases should be adjusted such that a temperature of from 1,000° to 1,500° C, preferably of 1,200° is maintained at the end of the reaction tube.

In the cleavage process of 80% sulfuric acid (1 kg of sulfuric acid per 1 kg of sulfur) the gas mixture leaving the reactor comprises about 81% by weight of sulfur dioxide, 1% of $SO_3$, 12% of $H_2O$ and about 7% of oxygen.

These values may slightly change, in case that the sulfuric acid used contains considerable quantities of organic and mineral impurities. The organic impurities are decomposed to give $CO_2$, the mineral impurities are discharged in the form of a finely divided liquid salt melt.

In case that the sulfuric acid used contains metallic salts, two methods for eliminating the salts from the gas current have proved particularly advantageous:

1. One method consists in cooling the hot cleavage gases on cooling surfaces having the corresponding dimensions to such an extent that the mists condense to form salt melts, but do not solidify. This may be performed by cylindric tubes being cooled inside. Wing-like fittings may additionally be fixed, advantageously in the upper part of the tube, in case that the gases enter from below in order to enlarge the cooling surface.

In the case of a higher output of 1,000 kg/h of sulfur and 1,000 kg/h of 80% sulfuric acid a steel tube of a length of 155 m (diameter of about 1 m), being composed of annular tubes (diameter about 38 cm), passed by water, is sufficient for cooling.

A gravity separator (for example a cyclone having heated walls) may also be series-connected before the cooling surfaces. It is important that care be always taken that the salt melts do not solidify and that the apparatus do not become obstructed. In order to avoid solidifying of the salt melts wall temperature depending on the salt mixture used, of from 300° to 500° C (on the outside), are necessary. This corresponds to inner temperatures of from 250° to 450° C, which may be obtained by means of mercury or salt melts. It is likewise possible to enable growing of the salts on the cooling surfaces in certain zones of the heat exchanger, to melt the salts anew and to let them drip off by stopping cooling.

2. A second rather efficient form of eliminating the salt consists in recycling a salt melt ("salt quenching"). For this purpose a molten salt, for example, sodium bisulfate, is introduced by pumping into a column 3 being composed of a series of feed plates 3a provided with weirs 3b and injection devices 3c for the salt melt (nozzle system). The hot reaction gas (for example entering at the top) is contacted with the salt melt in the column and thus cooled from about 1,000° C to about 300° C. The gas thereby forcibly is passed through plates provided with overflow weirs. Bubble-cap plate columns, sieve plate columns and valve plate columns are not recommended as they become easily obstructed. By the intense contact of the reaction gas with the sodium bisulfate melt the gas is liberated to a high extent from salt portions in the form of vapour or mists. This forced passage has proved especially advantageous. It assures a high self-purifying effect as well as high degrees of separation for the salt carried away with the flow of the cleavage gases. The salt melt heated to 300° C by the hot gas (sodium bisulfate) is led from the bottom of the vessel into a heat exchanger 5 by means of an immersion pump 4 and cooled anew to about 250° C. In this heat exchanger steam is produced simultaneously 12 from the feed water of the boiler 11 (of about 25 atmospheres).

The use of sodium bisulfate in the form of a salt melt is especially advantageous especially in case that the sulfuric acid is contaminated with sodium salts, owing to the fact that most of the sodium salts are transformed into sodium bisulfate in the presence of $SO_3$. The excess of the salt malt may be withdrawn continuously or from time to time via conduit 29 and be worked up. The column, the heat exchanger and immersion pump may be made of ferrosilicon, titanium or aluminum.

The reaction gas having a temperature of about 300° C and being liberated from the salt still contains small quantities of $SO_3$. For the purpose of removing them the gas is fed to a column 6 via conduit 13 and washed with dilute sulfuric acid, whereby it is further cooled. The partial pressure of steam of the washing liquid should correspond approximately to that of the reaction gas, which may be effected by modifying temperature and concentration of the washing liquid within wide limits. The partial pressure of steam of the reaction gas quite naturally depends on the quantity and the water content of the cleaved sulfuric acid. If the partial pressure of steam of the washing liquid should be higher than that of the gas to be purified the washing sulfuric acid is concentrated and additional water is introduced into the gaseous phase.

Suitable washing liquids are 10 to 80%, preferably 40 to 60% sulfuric acid; a 40% sulfuric acid, for example, may be used at a temperature of 80° C, if the partial pressure of steam shall be 210 torrs. The waste gas containing sulfur dioxide is simultaneously cooled to about 80° to 150° C by the washing process in column 6.

In order to prevent a slow increase of the concentration of the washing acid by the absorbed sulfur dioxide, the corresponding quantity of water is added continuously to the washing liquid via conduit 17. Freshly formed dilute sulfuric acid is withdrawn at the same rate via conduit 28 and may then be recycled to the thermal cleavage in 2 via conduit 9 together with the sulfuric acid used as starting material.

The water containing sulfuric acid used for washing is introduced into column 6 at the top via conduit 14 in a finely divided form and withdrawn at the bottom of the column after having absorbed the small portions of $SO_3$, transported by the pump 15 to the heat exchanger 16 where it is cooled to the initial temperature.

The gas mixture leaving the column 6 is already pure enough to be worked up, for example, to sulfite or bisulfite. For this purpose it can be withdrawn via conduit 18. In order to remove from the gas additionally the steam, the gas leaving the sulfuric acid column 6 is cooled via conduit 19 in a series-connected column 7 to ambient temperature (of about 35° C) by cycling cooling water. For this purpose cold water is fed to the column 7 at the top in finely divided form via conduit 20. The quantity of water contained in the gas thereby separates to a large extent by condensation. The liquid water separates at the bottom, is withdrawn by means of the pump 21, passed to the heat exchanger 22 and anew cooled.

For the purpose of replacing the water withdrawn via conduit 17 fresh water may be fed to the conduit 20 from time to time via conduit 23. If the quantity of water obtained in the condensation is higher than the quantity fed to the column 6 via conduit 17, the excess may be withdrawn via conduit 30. This water is saturated with sulfur dioxide. $SO_2$ may be blown out therefrom with oxygen, if desired, and be recycled to the burner 1.

Still remaining traces of water must be removed as well for the catalytical oxydation yielding $SO_3$ as for the separation in the form of pure $SO_2$. For this purpose the gas is introduced at the bottom of a drying column by passing from the column 7 through conduit 24. From the top of the column liquid concentrated sulfuric acid is added in a counter current via conduit 25 in a finely dispersed form. The sulfuric acid is passed anew to the top by the pump 26 and is reused. It must be replaced by fresh sulfuric acid from time to time. The gas mixture dried in this way comprising sulfur dioxide and oxygen may be directly worked up to $SO_3$. It may, however, also be separated in a liquid form in known manner, for example by applying pressure. For this purpose it is withdrawn from the column 8 via conduit 27.

When using sulfuric acid containing organic impurities the carbon dioxide formed in the cleavage remains in the sulfur dioxide and optionally is led with the latter to the contact furnace for preparing sulfur trioxide.

What is claimed is:

1. A process for the preparation of essentially pure sulfur dioxide from waste sulfuric acid containing metal salt impurities and at least 50% by volume sulfuric acid, which consists essentially of burning finely divided liquid sulfur with an oxygen containing gas, containing at least 70% by volume oxygen, to produce not flame gases and directly heating the waste sulfuric acid with the hot flame gases to a temperature of 1,000° to 1,500° C to obtain a combustion gas consisting essentially of $SO_2$, water, $O_2$, metal salt impurities and a small amount of $SO_3$, cooling the hot gases to a temperature of about 300° to 500° C by direct contact with a salt melt quench coolant to condense metal salt impurities and to separate the metal salt impurities from the combustion gas.

2. Process as claimed in claim 1, which comprises burning technically pure oxygen with sulfur.

3. Process as claimed in claim 2, wherein the molar ratio of $O_2/S$ in the combustion is in the range of from about 1.0 – 1.55.

4. Process as claimed in claim 1, which comprises using waste sulfuric acid containing organic impurities.

5. Process as claimed in claim 1, which comprises washing the separated combustion gases with water-containing sulfuric acid, whereby they are cooled to about 80° to 150° C and removing the residual water content of the gases by condensation.

6. A process of claim 1 wherein the salt melt quench consists essentially of sodium bisulfate.

7. The process of claim 1 wherein the separated combustion gas is directly contacted with dilute sulfuric acid to remove $SO_3$, further cooled by direct contact with water to condense and remove water and subsequently directly contacted with concentrated sulfuric acid to remove any residual water and essentially pure anhydrous $SO_2$ is recovered.

* * * * *